United States Patent [19]

Robertson

[11] Patent Number: 5,705,077
[45] Date of Patent: Jan. 6, 1998

[54] METHOD OF CONTROLLING FLUORIDE SCALE FORMATION IN AQUEOUS SYSTEMS

[75] Inventor: Jennifer J. Robertson, Newmarket, N.H.

[73] Assignee: BetzDearborn Inc., Trevose, Pa.

[21] Appl. No.: 594,220

[22] Filed: Jan. 31, 1996

[51] Int. Cl.$^6$ ................................................. C02F 5/08
[52] U.S. Cl. ................................. 210/698; 164/486
[58] Field of Search .......................... 210/698–701; 164/486; 252/180

[56] References Cited

U.S. PATENT DOCUMENTS

| | | | |
|---|---|---|---|
| 3,776,850 | 12/1973 | Pearson et al. | 252/89 |
| 4,654,159 | 3/1987 | Bush et al. | 252/95 |
| 4,659,481 | 4/1987 | Chen | 210/697 |
| 5,062,962 | 11/1991 | Brown et al. | 210/698 |
| 5,139,702 | 8/1992 | Carter et al. | 210/698 |
| 5,147,555 | 9/1992 | Brown et al. | 210/698 |
| 5,183,590 | 2/1993 | Carter et al. | 252/392 |
| 5,248,438 | 9/1993 | Perez | 210/698 |
| 5,256,332 | 10/1993 | Kessler | 210/698 |
| 5,311,925 | 5/1994 | Waltman | 164/486 |
| 5,378,372 | 1/1995 | Carey et al. | 210/698 |
| 5,468,393 | 11/1995 | Zidovec et al. | 210/698 |

FOREIGN PATENT DOCUMENTS 293156  10/1990  Japan .

*Primary Examiner*—Peter A. Hruskoci
*Assistant Examiner*—Betsey J. Morrison
*Attorney, Agent, or Firm*—Alexander D. Ricci; Richard A. Paikoff

[57] ABSTRACT

A method of treating water to inhibit the formation of fluoride salt scale is disclosed. The method is particularly effective at inhibiting the formation and deposition of fluoride containing salts in spray water cooling systems such as steel casting systems. The method comprises introducing into the aqueous system a polyepoxysuccinic acid of the general formula:

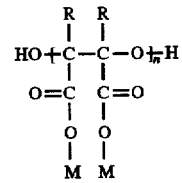

where n ranges from about 2 to about 11, M is hydrogen or a water soluble cation such as Na$^+$, NH$_4^+$ or K$^+$ and R is hydrogen, C$_{1-4}$ alkyl or C$_{1-4}$ substituted alkyl.

12 Claims, No Drawings

METHOD OF CONTROLLING FLUORIDE SCALE FORMATION IN AQUEOUS SYSTEMS

FIELD OF THE INVENTION

The present invention relates to the treatment of water to inhibit the formation of scale. More particularly, the present invention relates to the use of a polyepoxysuccinic acid to inhibit fluoride salt scale formation in aqueous systems.

BACKGROUND OF THE INVENTION

In an aqueous system such as a steel casting process, molten steel is shaped as it passes through a mold. This mold is coated with powder to prevent the adherence of steel to the sides. Many mold powders contain fluoride salts which dissolve in the spray water used to cool the hot molten slab. These fluoride-containing solutions are splashed on the inside of the enclosure which houses the spray nozzle banks (the spray chamber) and on the outside of the spray nozzles in such a continuous caster spray water system. Subsequently, fluorides are deposited in and around the spray nozzles and the piping immediately preceding the nozzles, particularly in areas of decreased spray water flow and high radiant heat. Water to the spray nozzles is from the cooling tower at a pH of about 8. Dissolution of mold powders decreases the pH to about 4.

It would be advantageous to prevent the formation of scale in and around the spray nozzles and chambers, thereby enhancing spray water cooling efficiency by increasing water flow and maintaining the spray pattern, reducing the potential for a breakout which poses serious safety concerns, and reducing production downtime. Such objectives are accomplished by the present invention.

DETAILED DESCRIPTION OF THE INVENTION

The method of the present invention comprises treating industrial waters with a polepoxysuccinic acid (hereinafter Polymer A) of the general formula:

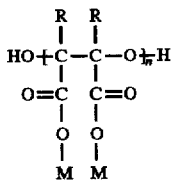

where n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl (preferably R is hydrogen).

A method of preparing a polyepoxysuccinic acid similar to that employed as a scale control agent in the present invention is described in U.S. Pat. No. 4,654,159, Bush et al. The Bush et al. patent describes ether hydroxypolycarboxylate prepared from epoxy succinates by treatment with an alkaline calcium compound. The polyepoxysuccinic acid of a specific molecular weight distribution is described in Bush et al. as a useful detergent builder due to its ability to act as a sequestering agent. The sequestering agent of Bush et al. complexes with hardness cations in water supplies which aids in detergent processes by preventing the cations from adversely effecting the detergents.

In the present invention, the polyepoxysuccinic acid is added to aqueous systems at substoichiometric levels to inhibit fluoride-containing salt scale formation. The method of the present invention provides effective deposition inhibition in waters having relatively high Langelier saturation indexes. The method of the present invention provides such control at relatively low active treatment levels without the use of phosphates or phosphonates.

DESCRIPTION OF THE PREFERRED EMBODIMENTS

The present invention pertains to a novel method of inhibiting the formation of fluoride salt scale such as calcium fluoride scale from aqueous systems. Specifically, the method of the present invention comprises adding to an aqueous system polyepoxysuccinic acid of the general formula:

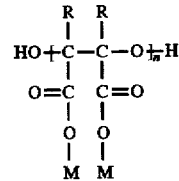

where n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl (preferably R is hydrogen).

The polyepoxysuccinic acid material employed in the present invention can be obtained by the polymerization of epoxysuccinate in the presence of calcium hydroxide or other alkaline calcium salts. The general reaction can be represented as follows:

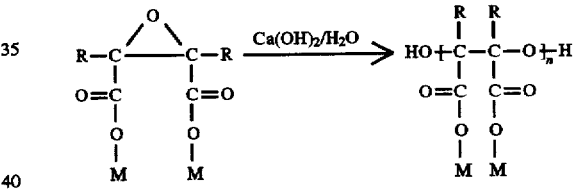

A complete description of a method of preparing such a polyepoxysuccinic acid of a specific molecular weight distribution is included in U.S. Pat. No. 4,654,159, incorporated herein by reference.

The treatment levels of polepoxysuccinic acid added to an aqueous system can range from about 25 parts per billion up to about 500 parts per million. The preferred treatment levels range from about 50 ppm up to about 100 ppm. The concentration of polyepoxysuccinic acid necessary to provide effective calcium fluoride control will, of course, vary from system to system. The treatment level will vary, in part, with changes in temperatures, pH, and LSI. However, in all cases, the concentration of polyepoxysuccinic acid added to an aqueous water system in accordance with the present invention is at substoichiometric concentrations. That is, the concentration of polyepoxysuccinic acid is much lower than the concentration of the scale forming material in the system to be treated.

The treatment of the present invention may be added to a circulating aqueous system such as a once-through cooling system, a recirculating system such as cooling tower where the water is reused or a static/stagnant system such as a stand-by service system. The treatment of the present invention is effective at inhibiting the formation of scale in systems where the water is in motion as well as systems where the water is static or stagnant.

The present invention will now be further described with reference to a number of specific examples which are to be regarded solely as illustrative and not as restricting the scope of the present invention.

Laboratory experiments were conducted with solutions of pH, $Ca^{2+}$ and $F^-$ levels typical of those in spray water systems and those encountered under more aggravated process upset conditions. Plant water was obtained and spiked with additional calcium and fluoride to resemble conditions at the spray nozzles. The concentration of the soluble $Ca^{2+}$ and calcium inhibition were determined relative to a control under the same conditions. Static beaker and dynamic recirculated tests were conducted. In the static beaker tests, several sets of varying calcium and fluoride levels were evaluated.

Static Beaker Tests

Condition I: (Synthetic Water)

600 ppm $Ca^{2+}$ as $CaCO_3$, 75 ppm $F^-$, 500 ppm $Mg^{2+}$ as $CaCO_3$, 250 ppm $SO_4^{2-}$, pH=7, Temperature=50° C., time= 18 hours.

Condition II: (Pre-clarifier Plant Water)

Spiked to 621 ppm $Ca^{2+}$ as $CaCO_3$, 253 ppm $F^-$, pH=8, temperature=30° C., time=4 hours.

Calcium fluoride inhibition efficacy results of a commercially available phosphonate and Polymer A under Condition I are found in Table I. Table I shows the relative ability of phosphonate and a polyepoxysuccinic acid (Polymer A) to inhibit calcium fluoride using synthetic test water as described in Condition I.

TABLE I

| Static Beaker Tests - Condition I | | |
|---|---|---|
| Sample | ppm, actives | % Inhibition |
| Polymer A | 1 | 28 |
| | 5 | 32 |
| | 10 | 33 |
| Phosphonate | 1 | 16 |
| | 5 | 17 |
| | 10 | 17 |

As shown, the polepoxysuccinic acid polymer is more effective than the phosphonate under these conditions. Calcium levels in these systems are not typically this elevated. However, this result reflects the calcium tolerance and superior inhibition of Polymer A relative to a phosphonate under process upset conditions.

Calcium fluoride efficacy of phosphonate and Polymer A under Condition II with pre-clarifier water received from the field is summarized in Table II. In Table II, experiments were conducted with pre-clarifier plant water spiked to elevate the calcium and fluoride levels. Note that these particular test conditions are relatively severe and that Polymer A continued to outperform the phosphonate. Similar results were achieved at a pH of 4.

TABLE II

| Static Beaker Tests - Condition II | | |
|---|---|---|
| Sample | ppm, actives | % Inhibition |
| Polymer A | 5 | 21 |
| | 10 | 32 |
| | 25 | 82 |
| | 75 | 89 |
| Phosphonate | 5 | 9 |
| | 10 | 8 |
| | 12.5 | 11 |
| | 25 | 2 |
| | 75 | 3 |

Dynamic recirculation tests were conducted to duplicate the nozzle environment, with radiant heat generated from the slab. In these tests, pre-clarifier (or "scale pit") plant water was circulated over a metal sleeve heated to 205+/−5° C. Bulk water temperature was maintained at 21° C. Tests were conducted for 4 hours. Results are summarized in Table III. Table III shows the ability of Polymer A relative to phosphonate and AA/AHPSE (acrylic acid/allyl hydroxypropyl sulfonate ether sodium salt copolymer) to maintain calcium in solution in scale pit waters of two compositions where $CaF_2$ is expected to precipitate. As shown, Polymer A provided significant benefit over phosphonate and AA/AHPSE.

TABLE III

Percent Soluble Calcium Retained in Scale Pit Water Solutions by Selected Inhibitors After Four Hours in a Dynamic Test

| Scale Pit Water Composition | | | | | Percent Soluble |
|---|---|---|---|---|---|
| ppm $Ca^{++}$ as $CaCO_3$ | ppm $F^-$ as Fluoride | pH | Bulk Water Temperature | Treatment | Calcium Retained in Solution at T = 4 hours |
| 138 | 118 | 6.8 | 70° F. | Control | 75 |
| | | | | 0.5 ppm phosphonate | 85 |
| | | | | 0.5 ppm Polymer A | 95 |
| 99 | 135 | 7.6 | 70° F. | Control | 40 |
| | | | | 5 ppm AA/AHPSE | 65 |
| | | | | 4 ppm Polymer A | 88 @ T = 220 min |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of controlling the formation and deposition of fluoride salt scale in a caster spray water system containing calcium and fluoride ions comprising introducing into said system a substoichiometric amount sufficient for the purpose of a treatment comprising a polyepoxysuccinic acid of the general formula:

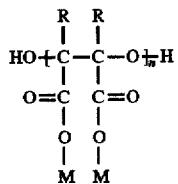

wherein n ranges from about 2 to about 50, M is hydrogen or a water soluble cation and R is hydrogen, $C_{1-4}$ alkyl or $C_{1-4}$ substituted alkyl.

2. The method as recited in claim 1 wherein said fluoride salt is calcium fluoride.

3. The method as recited in claim 1 wherein M is selected from the group consisting of $Na^+$, $NH_4^+$, and $K^+$.

4. The method as recited in claim 1 wherein said polyepoxysuccinic acid is added to the caster spray water system at active treatment levels ranging from about 25 parts per billion to about 500 parts per million.

5. The method as recited in claim 4 wherein said polyepoxysuccinic acid is added to the caster spray water system at active treatment levels ranging from about 50 parts per billion to about 100 parts per million.

6. The method as recited in claim 1 wherein n ranges from about 2 to about 25.

7. A method of controlling the formation and deposition of fluoride salt scale in a steel casting spray water system comprising adding to said steel casting spray water system containing calcium and fluoride ions a substoichiometric amount sufficient for the purpose of a treatment comprising a polyepoxysuccinic acid of the general formula:

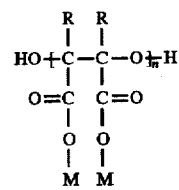

wherein n ranges from about 2 to about 50, M is hydrogen or a water soluble cation and R is hydrogen, $C_{1-4}$ alkyl or $C_{1-4}$ substituted alkyl.

8. The method as recited in claim 7 wherein said fluoride salt is calcium fluoride.

9. The method as recited in claim 7 wherein M is selected from the group consisting of $Na^+$, $NH_4^+$, and $K^+$.

10. The method as recited in claim 7 wherein said polyepoxysuccinic acid is added to the steel casting spray water system at active treatment levels ranging from about 25 parts per billion to about 500 parts per million.

11. The method as recited in claim 10 wherein said polyepoxysuccinic acid is added to the steel casting spray meter system at active treatment levels ranging from about 50 parts per billion to about 100 parts per million.

12. The method as recited in claim 7 wherein n ranges from about 2 to about 25.

* * * * *